United States Patent

Bennett et al.

[15] 3,638,558
[45] Feb. 1, 1972

[54] COOKING APPARATUS FOR COMESTIBLES IMMERSED IN HEATED OIL

[72] Inventors: Alden H. Bennett; Leslie G. Williams, both of Miami, Fla.

[73] Assignee: Burger King Corporation

[22] Filed: Mar. 26, 1970

[21] Appl. No.: 22,888

[52] U.S. Cl. ................................................99/408
[51] Int. Cl. ..................................................A47j 37/12
[58] Field of Search............99/408, 403, 325, 326, 329, 99/330, 331; 210/167, 171, 153

[56] References Cited

UNITED STATES PATENTS

| 2,212,905 | 8/1940 | Tota | 99/408 X |
| 2,243,661 | 5/1941 | Tota | 99/408 X |

Primary Examiner—Leon G. Machlin
Attorney—Birch, Swindler, McKie & Beckett

[57] ABSTRACT

Heated cooking oil is continuously circulated from laterally spaced outlets adjacent the one end of a cooking pot through a heating unit mounted immediately below the bottom of the cooking pot and returned to the cooking pot through laterally spaced inlets opening through the wall at the opposite end of the cooking pot. A fuel burner is disposed in the lower open end of a combustion chamber, such chamber enclosing the heating unit and a substantial part of the lower end of the cooking pot. A removable basket for comestibles to be cooked constructed of imperforate sheet material has limited portions thereof cut out and covered by perforate material and the forward front wall of such basket is slotted and covered with perforate material to enable safe insertion and removal of such basket from the cooking pot during continuous circulation of the hot cooking oil.

14 Claims, 8 Drawing Figures

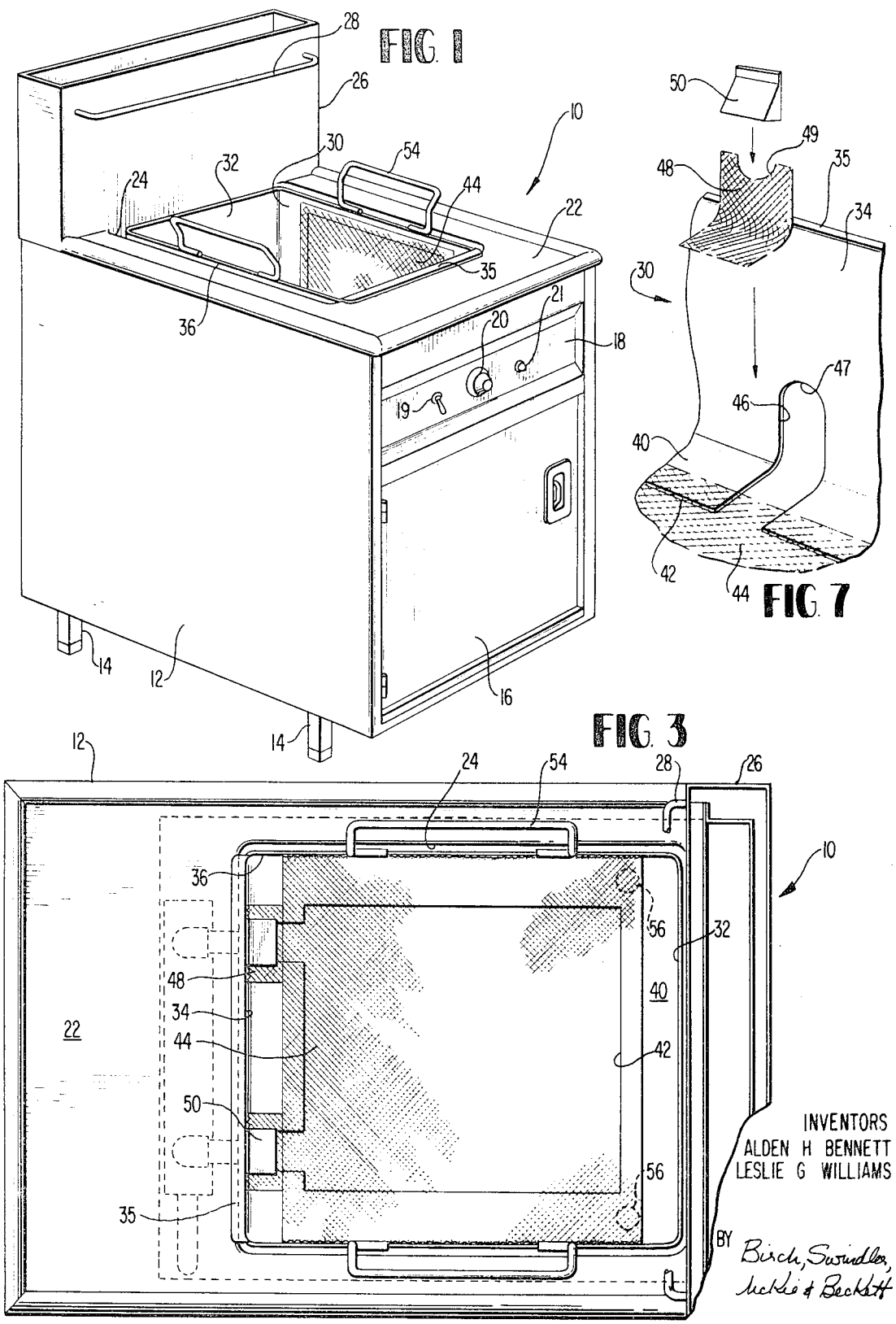

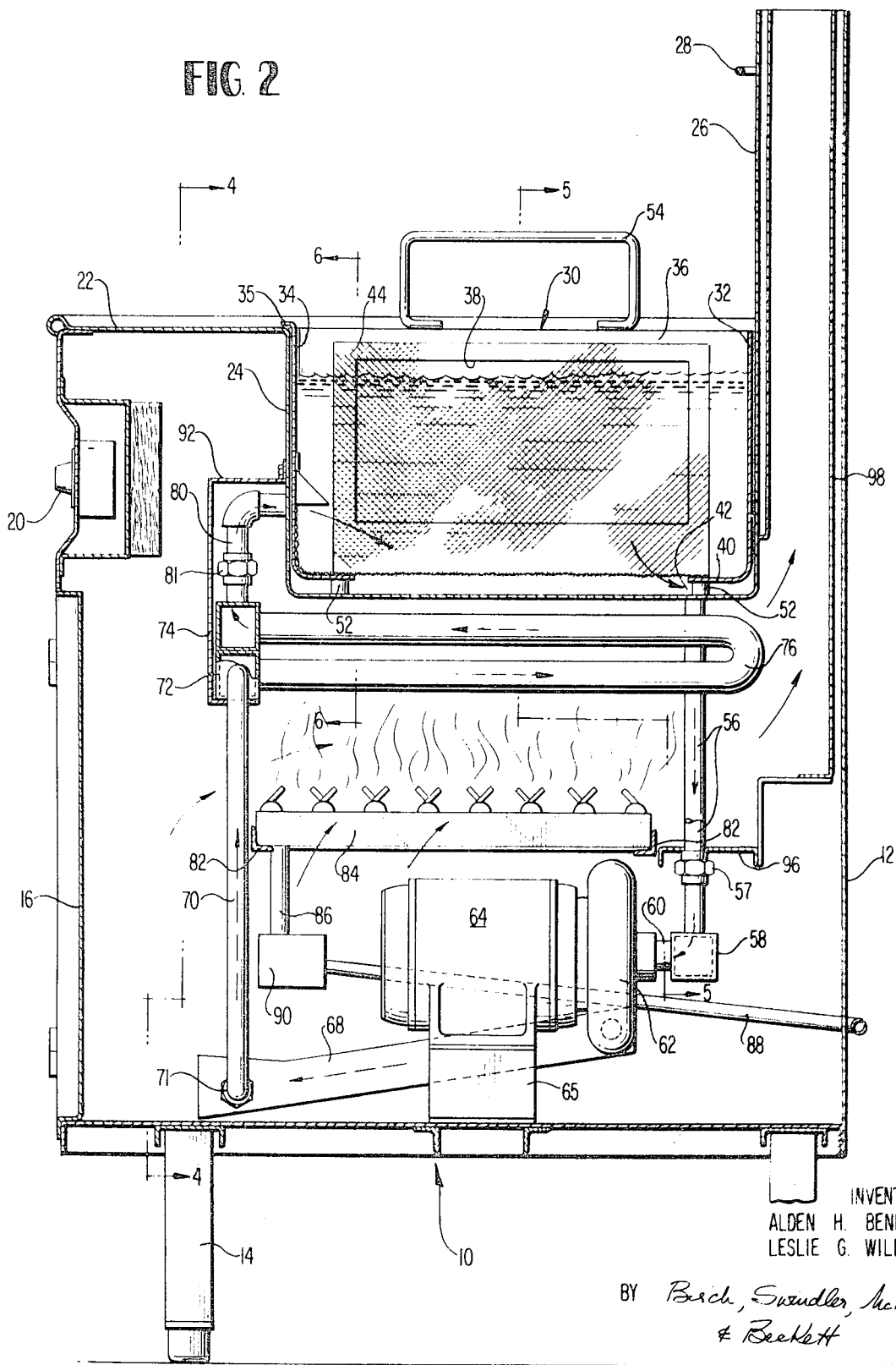

INVENTORS
ALDEN H. BENNETT
LESLIE G. WILLIAMS

BY Birch, Swindler, McKie & Beckett.

ATTORNEYS

3,638,558

COOKING APPARATUS FOR COMESTIBLES IMMERSED IN HEATED OIL

BACKGROUND OF THE INVENTION

The invention relates to the art of cooking and particularly is concerned with apparatus for so called deep fat frying where the comestibles to be cooked are immersed in a heated cooking oil. The particular apparatus of this invention is most suited for use in restaurants, institutions and the like where a sizable volume of comestibles, usually in a frozen condition, is to be deep fat fried during a relatively short period.

A number of proposals have been presented in the prior art aimed at enabling large volume cooking of comestibles through deep fat frying techniques. These have included equipment where the oil is withdrawn from the pot wherein the comestibles are cooked, reheated and then returned to the cooking pot in a continuous circulation procedure. Problems have been encountered in these prior art high volume deep fat fryers in their inability to avoid a substantial drop in cooking oil temperature and in requiring excessive recovery time for the oil to regain the desired cooking temperature, when a substantial volume of comestibles are introduced into the cooking pot. It is highly desirable that the cooking oil temperature not only remain as near constant throughout the cooking process but also that the oil temperature be uniform throughout all portions of the cooking pot during cooking.

Prior art proposals have also been plagued with the disadvantage of requiring an unreasonably large volume of cooking oil so as to increase the cost of operation by the necessity of having to frequently replace this large volume of oil due to the burning or carbonizing 'f particles deposited during cooking. Where the volume of oil is large relative to the quantity of comestibles introduced into the hot oil, the theory has been that the temperature of such a relatively large oil volume can more easily be held against substantial temperature drop or at least temperature recovery more speedily obtained.

It is a principal object of this invention to provide apparatus for deep fat frying comestibles wherein rapid recovery from any decrease in cooking temperature caused by introduction of the comestibles to be cooked is achieved while using a minimum volume of cooling oil in relation to the quantity of comestibles introduced.

An important object of this invention is to provide cooking apparatus wherein a heating unit, through which oil is circulated in passing from and to the cooking pot, is closely associated with the bottom of the cooking pot and a combustion chamber is formed around such heating unit and a substantial portion of the lower end of the cooking pot to obtain maximum transfer of heat to the cooking oil both through the unit and through the pot walls by way of combustion gases produced by a burner.

Another significant object of the instant invention is to provide deep fat frying apparatus wherein a removable basket constructed of imperforate rigid sheet material with only limited areas of perforate material is provided for use with continuous cooking oil circulation and external heating of the cooking oil, with the basket being formed for ease of cleaning and for safe positioning in and removal from the cooking pot while the oil is being continuously circulated from and to the cooking pot.

Other objects and advantages of this invention will become apparent from the following description of a specific embodiment of the invention taken in connection with the accompanying drawings, the embodiment of this invention being set forth solely by way of illustration and example.

BRIEF DESCRIPTION OF THE DRAWINGS

FIG. 1 is a perspective view of the comestible cooking apparatus of this invention.

FIG. 2 is a vertical sectional view of the apparatus of FIG. 1.

FIG. 3 is a plan view of the apparatus shown in FIG. 1.

FIG. 7 is an exploded perspective view showing a part of the removable basket which receives comestibles during cooking.

DETAILED DESCRIPTION

Figure 4:
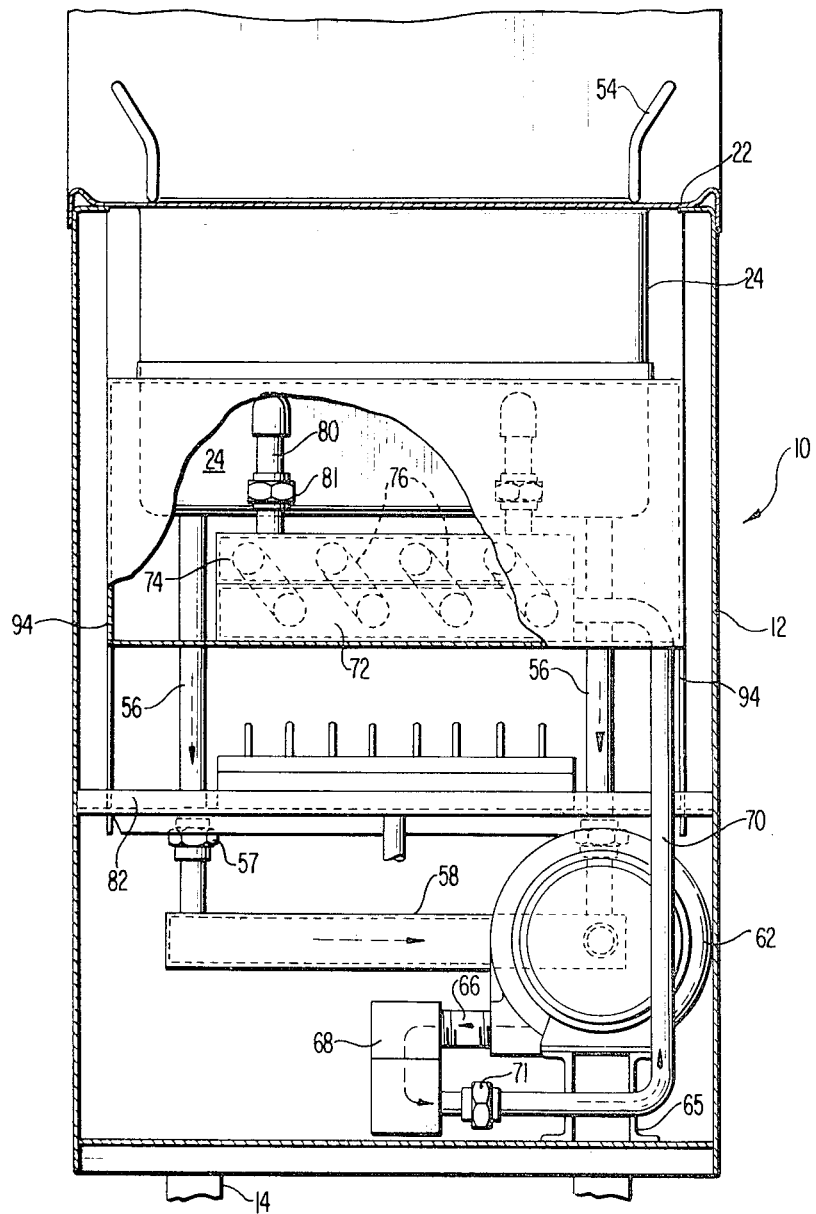
FIG. 4 is a sectional view taken on line 4—4 of FIG. 2 with a part thereof shown broken away.

A complete cooking apparatus 10, wherein comestibles are to be cooked when immersed in heated cooking oil, is shown on FIG. 1. This apparatus is made up of an upstanding cabinet 12 supported on four legs 14. The cabinet has a hingedly mounted front door 16 which may be opened to provide access to the components within the cabinet 10 as may be needed for cleaning and servicing. The front wall of the cabinet also is provided with a control panel 18 which has mounted thereon a main off-on control switch 19, an adjustable thermostat control 20 and a pilot light 21 which is illuminated when the apparatus is in operation.

The top of the cabinet 12 provides a work surface 22. This work surface has a rectangular opening mounting a cooking pot 24. This cooking pot is recessed below the work surface 22 of the cabinet 12 and opens upwardly through such surface. In use of the apparatus, a quantity of heated cooking oil is disposed in the cooking pot and a removable basket carrying the comestibles to be cooked lowered into the cooking pot to remain therein during the cooking process.

At the rear of the cooking pot 24 and adjacent the rear of the cabinet 12, flue housing 26 is formed extending upwardly from the rear of the cabinet work surface 22. Flue housing 26 is shown provided with a rail 28 mounted horizontally thereon which may be used in supporting a conventional removable comestible retaining basket out of the oil in the cooking pot 24 during times that comestibles are not being cooked.

A removable strainer basket 30 is shown on FIG. 1 in its operative position disposed within the cooking pot 24. It will be understood that conventional fry baskets (not shown) to hold the comestibles are used and placed within the strainer basket 30 during the cooking operation. The basket 30 is particularly constructed for cooperation and use with the cooking pot 24 recessed in the work surface 22 of cabinet 12. This construction is of importance in not only obtaining effective and rapid cooking in conjunction with the conventional fry baskets when placed therein, but also to most efficiently operate in conjunction with the heated oil circulating system as described hereinafter. It construction minimizes accumulation of carbonized food particles, etc. in corners or crevices of the basket and such accumulations which may occur can be readily cleaned from the basket by reason of its particular construction.

The removable basket 30 is constructed of imperforate sheet material, preferably a material such as stainless steel being used in this respect. Forming the basket from such sheet material is carried out to provide smoothly curved corners at the junctures of the sidewalls with each other and with the bottom. The rear wall 32 of the removable basket 30 is imperforate in the final basket construction. Likewise, the basket front wall 34 remains imperforate except for the formation of two slotted openings as described hereinafter. The upper end of this particular wall of the basket is shown provided with a horizontally out-turned lip 35 extending therealong and which snugly overlies the portion of the work surface 22 immediately forward of the juncture of the cooking pot front wall with surface 22. This lip 35 is particularly important in preventing the strainer basket from being inserted backwards which would then block the oil inlets to the pot.

The sidewalls 36, however, each have a rectangular aperture 38 formed therein. Similarly, the bottom 40 of basket 30 has an aperture 42 formed therein. The apertures in the sidewalls and bottom of the basket 30 are covered by a length of perforate material 44 secured to overlie the three apertures. This material may consist of expanded metal or wirecloth, preferably of stainless steel. The length of perforate material is disposed interiorly of the sidewalls and bottom of the basket 30 to extend across the two sidewall aperture 38 and bottom aperture 42, and is secured to the basket adjacent the peripheries of these apertures as by being welded thereto. The disposition of the length of perforate material 44 relative to the sidewalls 36 and bottom 40 of the basket 30 may best be seen by reference to FIGS. 2, 3, 5 and 6.

Figure 6:
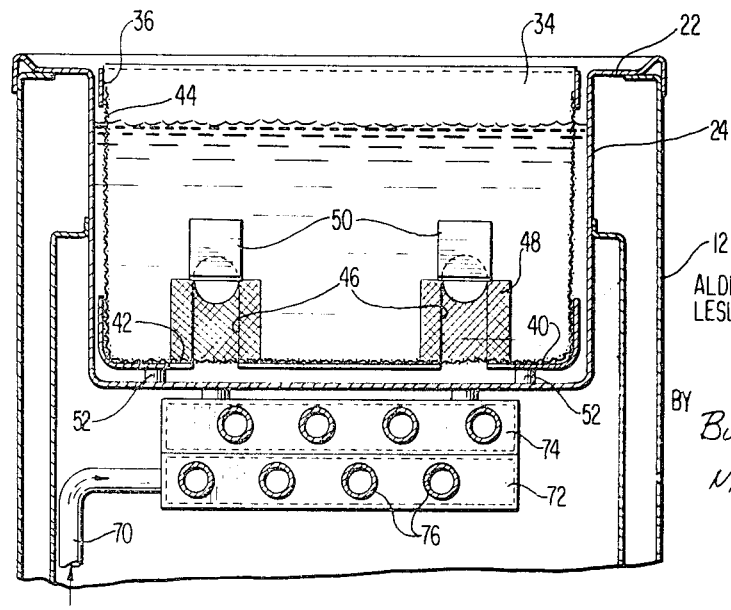
FIG. 6 is a sectional view taken on line 6—6 of FIG. 2.

As mentioned hereinabove, the front wall 34 of the basket 30 is essentially imperforate. Referring to FIGS. 6 and 7, it will be seen that the front wall 34 is provided with two laterally spaced slotted openings 46. Each of these slotted openings is formed, as best illustrated by the enlarged detail of FIG. 7, to extend downwardly from a semicircularly formed upper end 47 on the front wall to the bottom 40 of the basket and to extend rearwardly along the basket bottom to open into the aperture 42 in the basket bottom 40.

A portion of each of the two slotted openings 46 is covered by the perforate material 44 adjacent the point where the slotted openings join with the bottom aperture 42. The major portion of the remainder of each of the slotted openings 46 is covered by a piece 48 formed of perforate material such as expanded metal or wirecloth, preferably of stainless steel. The piece 48, as shown in FIG. 7, is bent into a L-shaped configuration to conform with the juncture of the front wall 34 and bottom 40 of the basket. The upper end of piece 48 has a semicircular notch 49 therein.

The piece 48 is secured across the slotted openings 46 as by welding its edges to the portions of the front wall and bottom of the basket lying along the slotted opening 46. In its mounted position, the piece 48, having the semicircular notch 49 at its upper end, cooperates with the semicircular upper end 47 of slotted opening 46 to provide a circular unobstructed hole through the front wall of the basket. Such a hole is thus provided at the upper end of each slotted opening 46 as best shown on FIG. 6.

A deflector 50 is secured to the inner surface of front wall 34 of the basket 30 in the position as best illustrated in FIGS. 2, 3 and 6, one deflector being provided for each of two slotted openings 46. These deflectors are mounted relative to the unobstructed holes formed by end portions 47 of slotted openings 46 and notches 49 of pieces 48 so that hot oil entering the cooking pot 24 and thence entering basket 30 through these unobstructed holes in front wall 34 will be deflected against passing upwardly within the basket. Also the deflectors 50 provide a guard against comestible products in the basket entering or obstructing the holes through which the hot oil flows into the basket.

As seen in FIG. 3, the lateral dimensions of the basket 30 are such that the front, rear and sidewalls are closely adjacent the upstanding walls of the cooking pot 24 when the basket is disposed in its operative position.

Figure 5:
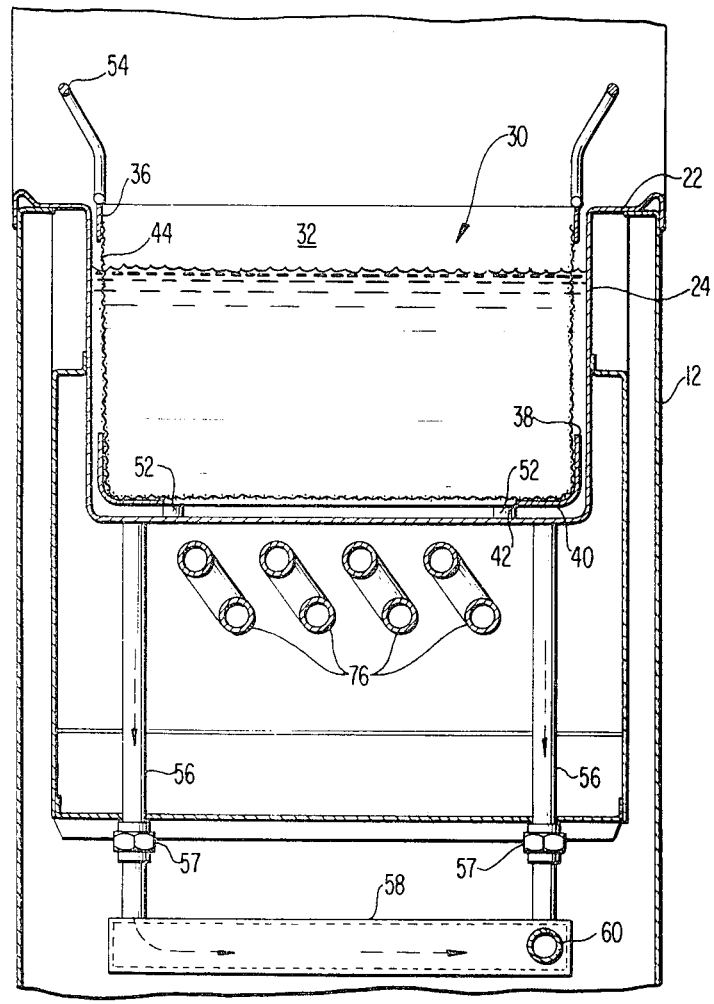
FIG. 5 is a sectional view taken on line 5—5 of FIG. 2.

The bottom 40 of the basket 30 has four short feet 52 fastened thereto so that in its operative position, the basket 30 will be supported above the bottom of the cooking pot 24 with the basket bottom spaced from the bottom of the cooking pot. This spaced relationship is shown in FIGS. 2, 5 and 6. The spacing facilitates flow of cooking oil within the basket 30 and through the perforate material 44 covering the aperture 42 downwardly and then out through the oil circulating and heating system hereinafter described.

A handle 54 is secured, as by welding, to the top edge of each of the sidewalls 36 of the basket 30. These two handles 54 provide means for conveniently handling the basket 30 in placing it in and removing it from the cooking pot 24.

Referring to FIG. 2, the cooking oil circulating and heating system associated with the cooking pot 24 may best be seen. A pair of outlet pipes 56, in the particular embodiment illustrated, communicate through the bottom of cooking pot 24 with the cooking oil in the pot, these pipes providing oil outlets from the pot adjacent each of the opposite rear corners of the cooking pot bottom. It will be appreciated however, that the outlets may be disposed elsewhere than in the bottom according to the construction of the strainer basket 30 and locations of the oil inlets. The pipes 56 connect through pipe unions 57 with a box header 58 disposed horizontally within cabinet 12 adjacent the lower rear corner thereof. The cooking oil flowing down through pipes 56, unions 57 and into header 58 passes out of such header through pipe nipple 60 which is connected to the intake of pump 62. Pump 62 is driven by an electric motor 64, with the pump and motor combination being appropriately mounted on a bracket 65 carried by the base of cabinet 12.

A nipple 66 connects the outlet of pump 62 with duct 68 which extends forwardly and downwardly (FIG. 2) to adjacent the front interior of cabinet 12. The heating oil is lead from duct 68 through riser pipe 70 which connects with duct 68 through pipe union 71.

The heating unit is constructed to include a pair of parallel abutting box headers 72 and 74 supported horizontally adjacent and immediately below the front wall of the cooking pot 24. The riser pipe 70 communicates with one end of the lower box header 72 to supply the oil thereto. A series of U-shaped heating tubes 76 are mounted horizontally with the ends of each tube communicating with the headers 72 and 74 respectively.

Four such tubes 76 are shown in the embodiment illustrated on the drawings although obviously more or less tubes could be used as desired. Each of these tubes is mounted relative to headers 72 and 74 with the plane of its U-shaped inclined relative to the vertical. This disposition of the tubes deposes the tube surfaces such that hot combustion gases from the hereinafter described burner may most effectively flow over and around such surfaces to achieve optimum heat exchange with the oil in the tubes and also facilitate such products of combustion transmitting heat to the bottom portion of the cooking pot 24.

The cooking oil flowing into header 72 from riser pipe 70 leaves such header through the lower run of each of the U-shaped tubes 76, flowing rearwardly in each tube, thence through the bend of the tube and then forwardly through the upper run of each tube where the oil enters the upper box header 74. Header 74 is connected through two pipes 80 by way of pipe unions 81 to the cooking pot 24. As shown these laterally spaced pipes 80 extend upwardly from header 74 and then rearwardly to communicate at laterally spaced positions with the interior of the cooking pt 24 through the front wall of such pot.

It will be appreciated that the spacing of pipes 80 and their inlets on the front wall of the cooking pot 24 corresponds with the spacing of the slotted openings 46 on the front wall of the basket 30. This relationship is important in that the highly heated cooking oil flowing into the pot 24 through the two pipes 80 is permitted to freely enter the basket 30 through the unobstructed holes at the upper open end of the slotted openings 46 in the basket front wall 34. It also is to be pointed out that by forming the slotted openings 46 to open into the aperture 42 in bottom 40 of the basket, such slotted openings only being covered by perforate material, the basket may be safely removed and inserted into the cooking pot 24 while heated oil is flowing into such pot through pipes 80.

The cabinet 12 has a formed pan member 82 mounted to extend between the sidewalls of such cabinet. This pan member has openings in its bottom which correspond to openings in the configuration of the fuel burner 84 which is above pan member 82.

The burner 84 is illustrated as a gas burner and preferably is one having a high B.t.u. output. The burner may be of standard commercial construction where the burner jets direct the combusting gas in and around the combustion supporting air flowing up through the burner configuration with air for combustion also being supplied from the front of the burner.

This combination supporting air enters the cabinet 12 through appropriate openings in the cabinet base. Gas is supplied to the burner through pipe 86 leading from a pipe 88 which is suitably connected at the rear of the cabinet to a gas supply (not shown). An electrically operated gas supply valve 90 is shown diagrammatically connected between the gas pipes 86 and 88 to operate in cutting off and on gas to burner 84. Of course, the gas burner will be provided with an appropriate pilot light and the various safety controls required for gas burning appliances.

A combustion chamber is provided to substantially enclose the burner 84 and more importantly form means for directing the combustion gases to effect most efficient heating of the cooking oil. In this connection the heating unit made up of headers 72 and 74 interconnected by oil heating tubes 76 is enclosed within the combustion chamber. Also a substantial portion of the lower end of the cooking pot 24 is enclosed by such chamber. Thus the combustion gases not only flow up, around and between the tubes 76 of the heating unit but they also impinge against the bottom and lower end portions of the upstanding walls of the cooking pot 24.

The oil inlet pipes 80 are thus enclosed at the front of the cooking pot by a shield 92 preferably removably connected so that access can be had to the pipe unions 81 should need arise for servicing the heating unit. Shield 92 extends forwardly from the midsection of the front wall of pot 24, then down in front of the pipes 80 and headers 72 and 74 of the heating unit, and then beneath the lower header 72. This leaves a combustion air inlet opening between the lower end of the shield 92 and the burner 84. Such opening also permits easy inspection of the burner's operation and for lighting the pilot light (not shown) by merely opening the door 16 of cabinet 12 for easy access to the components.

The sides of the combustion chamber are defined by plates 94 each of which extends outwardly from about the mid portion of each of the sidewalls of cooking pot 24 for a short distance and then downwardly, but spaced inwardly from the side of the cabinet 12, to a point slightly below the burner 84. These plates 94 cooperate with shield 92 to enclose a substantial portion of the lower parts of the upstanding walls of the cooking pot 24.

Rearwardly of the burner 84, the combustion chamber is completed by a portion 96 of the formed pan member 82 which supports the burner and the forwardmost end of a flue 98. The flue 98 is connected with the rear of the combustion chamber and extends upwardly in spaced relation to the flue housing 26. Thus the exhaust gases carried away from the apparatus through flue 98 are precluded from overheating the metal surfaces of the flue housing 26 by reason of the flue 98 being spaced away from the walls of the flue housing.

Figure 8:
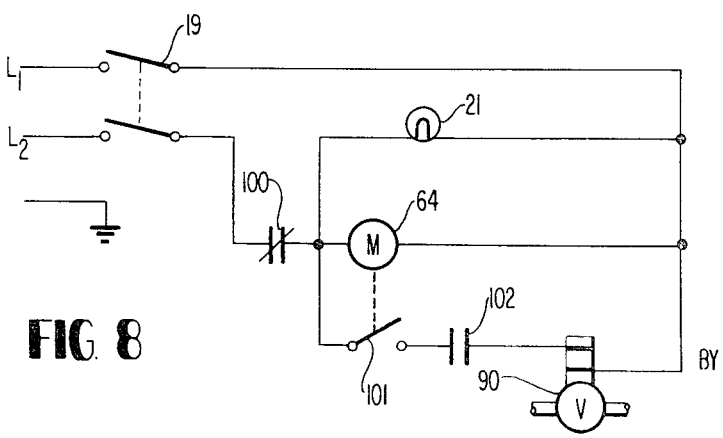
FIG. 8 is a schematic electrical diagram showing the circuit for control of operation of the cooking apparatus.

Reference may now be made to the schematic showing on FIG. 8 of the control circuit incorporated in the cooking apparatus. Appropriate power is supplied to the apparatus through lines L1 and L2, and an appropriate ground wire. The main power control switch 19 mounted on the panel 18 of cabinet 12 is used to turn the power on and off to the equipment. When switch 19 is manually closed and the fry pot 24 temperature is below the set point of the high limit thermostat so that its contacts 100 are closed, pilot light 21 is illuminated, and the motor 64 is energized thereby driving pump 62 to commence circulation of the cooking oil from the cooking pot through the heating unit and back to the cooking pot.

The illumination of pilot light 21 and energization of motor 64 are subject to interruption by the opening of contacts 100 in the line leading to light 21 and motor 64. The contacts 100 are controlled by a high temperature safety thermostat mounted to be immersed in and respond to the temperature of the oil in the oil circulating system. The contacts 100 of this high limit thermostat are normally closed as illustrated on FIG. 8. Only upon the occurrence of an improperly high oil temperature being sensed by the high limit thermostat will these contacts 100 open. Upon the opening of such contacts, the motor 64 is deenergized and, as will be explained in more detail the supply of heat from fuel burner 84 is also terminated.

As schematically illustrated on FIG. 8, motor 64 is provided with an appropriate speed responsive centrifugal switch 101. When the motor 64 is not operating this switch is in an open state as is shown on FIG. 8. When motor 64 is energized, with the high limit thermostat contacts 100 closed and switch 19 closed, the switch 101 closes as the motor builds up speed and stays closed while the motor 64 and pump 62 are running. This motor operated switch acts as a further safety to insure that the fuel burner 84 does not supply heat to the apparatus at a time when motor 64 is not operating pump 62 and accordingly, there is not oil circulating through the heating unit.

The gas valve 90 may be of a suitable commercial variety which typically is electrically energized to open the gas valve and supply gas to burner 84 and closes upon being deenergized. The gas valve is energized and open when the temperature of the cooking oil falls below the setting on thermostat control 20 on panel 18. This thermostat control 20 preferably provides an adjustable range of between 200° and 400° F. The thermostat for turning the gas valve on and off is also immersed in the oil of the oil temperature control circulating system with the temperature at which it responds to actuate gas valve 90 being adjustable by thermostat control 20. This control thermostat closes contacts 102 to effect opening of gas valve 90 when the oil temperature in the circulating system is below the setting of control 20. Once the oil temperature reaches the desired setting on control 20, the thermostat contacts 102 reopen, permitting gas valve 90 to close and consequently cutting off gas and burning above burner 84.

Preferably all of the components such as the cabinet, cooking pot, basket heating unit, piping and connections are constructed of stainless steel for sanitary and practical reasons in view of the apparatus being used in cooking products for human consumption.

It is to be understood that the apparatus for cooking comestible products of this invention is not to be limited to the particular construction of the preferred embodiment described and illustrated herein but that various changes and modifications may be made therein without departing from the spirit and scope of the invention as defined in the appended claims.

What is claimed:

1. Apparatus for cooking comestibles immersed in heated cooking oil comprising
   a cabinet supporting an upwardly opening cooking pot for cooking oil and having a flue housing extending upwardly above and disposed rearwardly of said pot, said pot being defined by a bottom and front, rear and sidewalls,
   a pair of outlets for cooking oil communicating with the interior of said pot at spaced points adjacent one end of said pot,
   a pair of inlets for hot cooking oil opening into said pot through the end of said pot opposite said one end at laterally spaced points disposed above said bottom,
   a heating unit mounted below said bottom to permit combustion gases to pass over said unit and impinge on the lower portion of said cooking pot,
   conduit means connecting said heating unit to receive oil to be heated from said outlets and supply hot oil to said inlets,
   circulating pump means in said conduit means operable to propel oil between said outlets and said inlets,
   wall means spaced inwardly of the cabinet exterior and flue housing defining a combustion chamber and flue leading from said chamber through and spaced inwardly of the walls of said flue housing, said combustion chamber enclosing said heating unit and a substantial portion of the lower parts of said front, side and rear walls of the cooking pot, the walls means forming said combustion chamber extending downwardly to form a lower open end for said chamber within said cabinet, and
   a fuel burner mounted in said lower open end to direct combustion gases over said heating unit and impinge onto the bottom and lower portion of the front, side and rear walls of said cooking pot.

2. Apparatus for cooking comestibles as recited in claim 1 wherein said heating unit has parallel headers connected to the respective ends of each of a series of U-shaped tubes, said tubes being disposed immediately beneath said bottom of the cooking pot and arranged relative to one another to permit combustion gases to pass over and between said tubes and impinge on the lower portion of said cooking pot, and said conduit means connecting said outlets to one of said headers and said inlets to the other said headers.

3. Apparatus for cooking comestibles as recited in claim 2 wherein each of said U-shaped tubes is disposed with the plane of the U-shape inclined relative to the vertical and the U-shaped tubes are parallel to each other and extend generally horizontal.

4. Apparatus for cooking comestibles as recited in claim 1 further comprising a removable strainer basket to receive means to retain comestibles during cooking, said strainer basket having a configuration closely approximating the dimensions of said cooking pot, said strainer basket being constructed of imperforate sheet material with limited portions cut out and covered by perforate material, said basket having a pair of slotted openings, each extending down along the basket front wall and along the basket bottom to an aperture in the basket bottom perforate material overlying substantially the entire area of each of said slotted openings, said slotted openings being laterally spaced to be aligned with the laterally spaced pair of inlets when said basket is positioned in said pot.

5. Apparatus as recited in claim 4 wherein the upper end of each of said slotted openings has an oil deflector mounted thereabove on the inner surface of the basket front wall.

6. Apparatus for cooking comestibles immersed in heated cooking oil comprising an upstanding cabinet providing an upper work surface having a cooking pot recessed beneath and opening upwardly through said surface, outlet means for cooking oil leading from adjacent one end of said cooking pot, inlet means for cooking oil formed in the wall at the opposite end of said cooking pot disposed above the cooking pot bottom, a removable strainer basket to receive means to retain comestibles during cooking having a configuration closely approximating the dimensions of said cooking pot, said basket being constructed of imperforate sheet material with apertures formed in the sidewalls and bottom of the basket and perforate material secured across said apertures to retain the comestibles within the basket, said basket having a slotted opening therein extending down along the front wall to the basket bottom and along the basket bottom to open into said bottom aperture and perforate material overlying substantially the entire area of said slotted opening, said opening in said front wall being disposed to be aligned with the cooking pot inlet means when said basket is positioned in said pot, a heating unit connected in conduit means extending from said cooking oil outlet means and to said cooking oil inlet means, circulating pump means in said conduit means to propel flow of oil through said heating unit from said outlet means to said inlet means, a fuel burner mounted beneath said heating unit to direct combustion gases over said unit, and wall means spaced inwardly of the exterior of said cabinet defining a combustion chamber, said combustion chamber enclosing said heating unit and a substantial portion of lower end of said cooking pot and having an open lower end in which said fuel burner is mounted.

7. Apparatus for cooking comestibles as recited in claim 6 wherein said cabinet has a flue housing extending upwardly adjacent the rear of said cabinet, and wall means define a flue communicating with said combustion chamber at its lower end and extending upwardly through said flue housing spaced from the walls of said housing.

8. Apparatus for cooking comestibles as recited in claim 6 wherein said heating unit has first and second headers parallel to each other and a series of generally U-shaped oil conducting tubes having their opposite ends connected to the first and second headers respectively.

9. Apparatus as recited in claim 6 wherein the upper end of said slotted opening has an oil deflector mounted thereabove on the inner surface of the basket front wall.

10. Apparatus for cooking comestibles as recited in claim 6 wherein said outlet means comprises a pair of outlets communicating with the interior of said pot as spaced points on said bottom adjacent said rear wall, and said inlet means comprises a pair of inlets in said front wall at laterally spaced points above said bottom.

11. Apparatus for cooking comestibles as recited in claim 10 wherein said pair of outlets communicate through parallel pipes extending downwardly through said combustion chamber with a header, and said circulating pump means has its inlet connected to said header and its outlet connected to said heating unit.

12. Apparatus as recited in claim 6 wherein said perforate has a pair of said slotted openings laterally spaced to be aligned with the laterally spaced pairs of inlets.

13. Apparatus as recited in claim 6 wherein said perforate material overlying substantially the entire area of said slotted openings leaves an unobstructed hole at the upper end of said opening positioned to align with said inlet means when said basket is disposed in said cooking pot.

14. Apparatus as recited in claim 13 wherein an oil deflector is mounted on the inner surface of the basket front wall sloping downwardly above said unobstructed hole.

* * * * *